Sept. 15, 1959 C. K. BAREFOOT 2,903,742
APPARATUS FOR RETREADING TIRES
Filed Sept. 30, 1957 5 Sheets-Sheet 1

INVENTOR.
Carlton Keith Barefoot
BY
ATTORNEYS

Sept. 15, 1959  C. K. BAREFOOT  2,903,742
APPARATUS FOR RETREADING TIRES
Filed Sept. 30, 1957  5 Sheets-Sheet 2
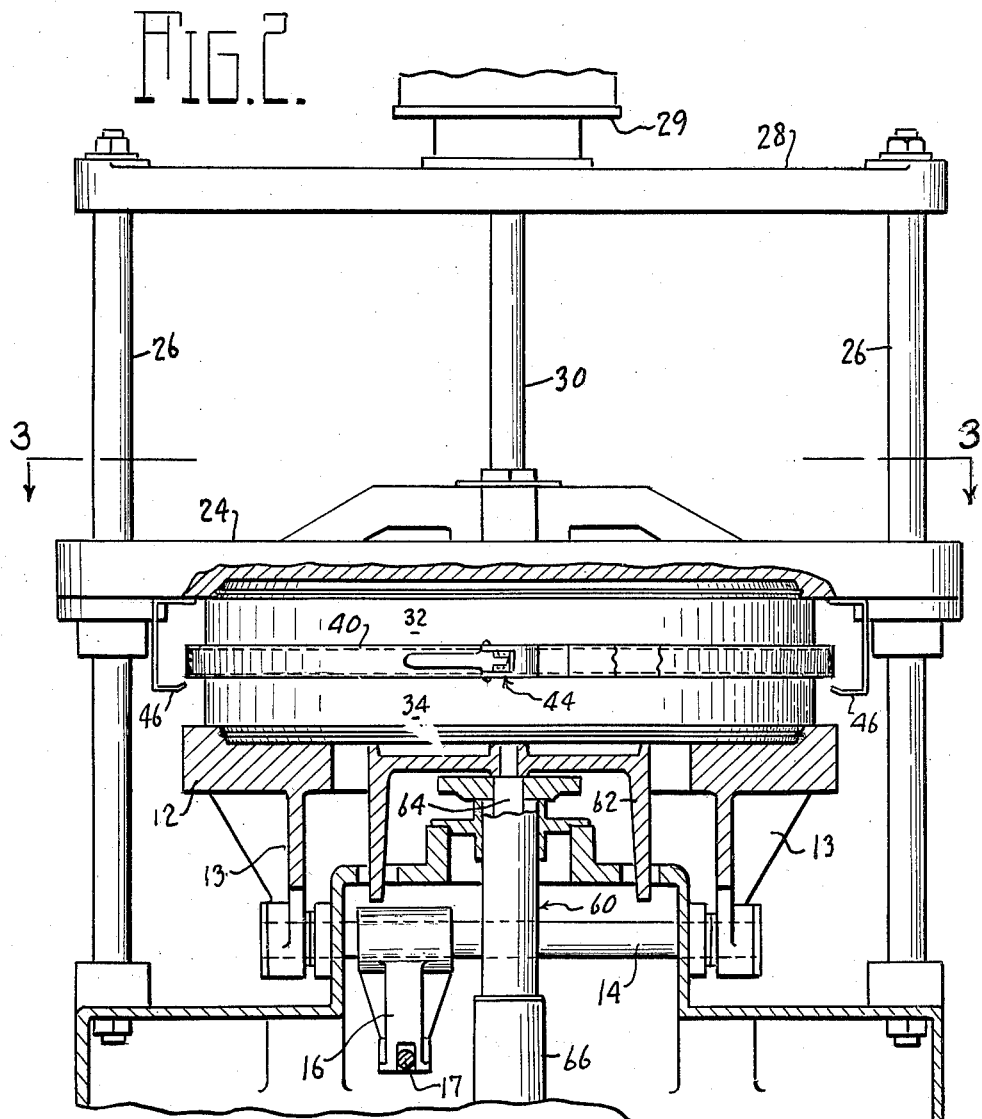
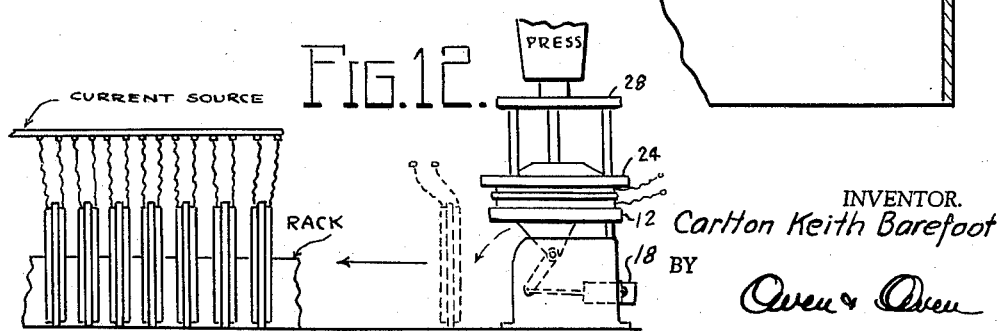
INVENTOR.
Carlton Keith Barefoot
BY
Owen & Owen
ATTORNEYS Sept. 15, 1959     C. K. BAREFOOT     2,903,742
APPARATUS FOR RETREADING TIRES
Filed Sept. 30, 1957                      5 Sheets-Sheet 3
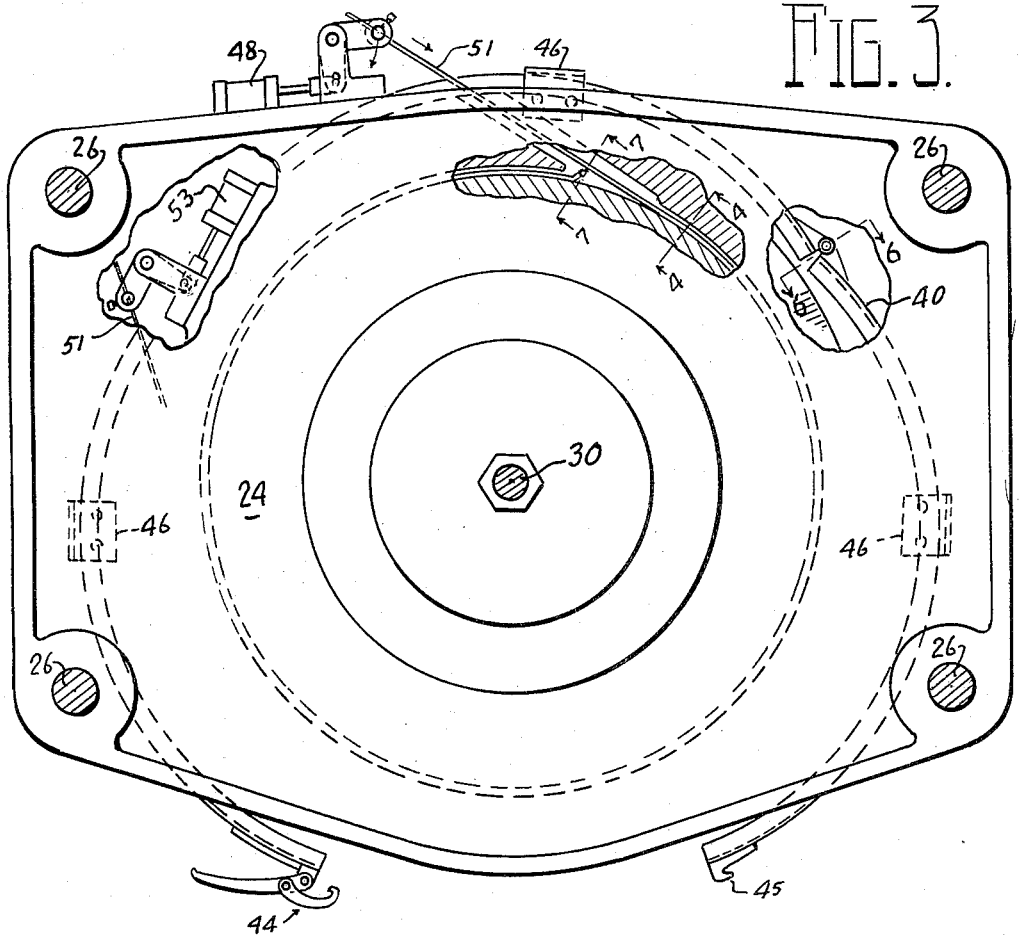
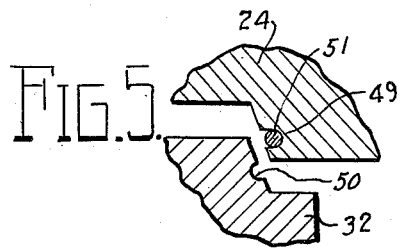
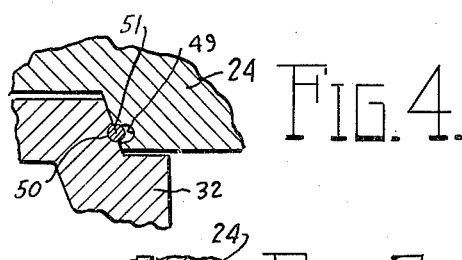
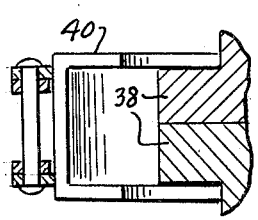
INVENTOR.
Carlton Keith Barefoot
BY
ATTORNEYS Sept. 15, 1959 C. K. BAREFOOT 2,903,742
APPARATUS FOR RETREADING TIRES
Filed Sept. 30, 1957 5 Sheets-Sheet 4

INVENTOR
Carlton Keith Barefoot
BY
ATTORNEYS

Sept. 15, 1959 C. K. BAREFOOT 2,903,742
APPARATUS FOR RETREADING TIRES
Filed Sept. 30, 1957 5 Sheets-Sheet 5

INVENTOR.
Carlton Keith Barefoot
BY
ATTORNEYS

United States Patent Office 2,903,742
Patented Sept. 15, 1959

2,903,742
APPARATUS FOR RETREADING TIRES

Carlton K. Barefoot, Muncie, Ind., assignor to Bacon American Corporation, Muncie, Ind., a corporation of Indiana Application September 30, 1957, Serial No. 687,145

7 Claims. (Cl. 18—18)

This invention relates to apparatus for retreading tires and is particularly directed to apparatus which will significantly reduce the equipment investment required for a relatively large production operation or, will significantly increase the production obtainable in a given shop area and with a given machine investment.

The present practice in retreading tires for trucks and automobiles requires that the tire to be retreaded be prepared with its band of unvulcanized rubber, placed in a mold which is attached to a press where the unvulcanized rubber can be subjected to the proper heat treatment. The tire is kept under pressure in the press for a predetermined length of time depending on the tire size and the quantity of rubber to be vulcanized to the carcass. The time required may vary from one hour to two hours or even longer. During all of this time the press remains closed and obviously only one tire can be retreaded at a time. The investment required for a shop capable of retreading, for example, eighty tires a day, would be the equivalent of at least ten presses. These units are relatively expensive and further, require a large floor area thus increasing the building investment necessary by the owner.

It has been heretofore proposed to recap tires in individual movable heated bands into which the prepared tire and its associated unvulcanized capping material are placed. These units are not capable of retreading a tire which requires that the new material extend down over the sides or shoulders of the tire for a substantial distance. In many instances recapping a tire is not sufficient for the user who desires a completely retreaded unit. Recapping apparatus of this nature has the definite advantage that it is movable from place to place in the shop and that it is quite inexpensive.

The primary object of the present invention is to provide apparatus for applying a retreading material to a tire carcass which is so constructed and arranged that the press is required to be used only a small portion of the time and can be used repeatedly since the time consuming vulcanization takes place with the mold removed from the press.

Other objects and advantages of the invention will become apparent from the following description of a preferred embodiment thereof, reference being had to the accompanying drawings, in which—

Fig. 2 is a side elevational view with parts in section showing a press in the closed position;

Fig. 3 is a section on line 3—3 of Fig. 2;

Fig. 4 is a section on line 4—4 of Fig. 3;

Fig. 5 is a sectional view similar to Fig. 4, but with the parts in disengaged relation;

Figure 1:
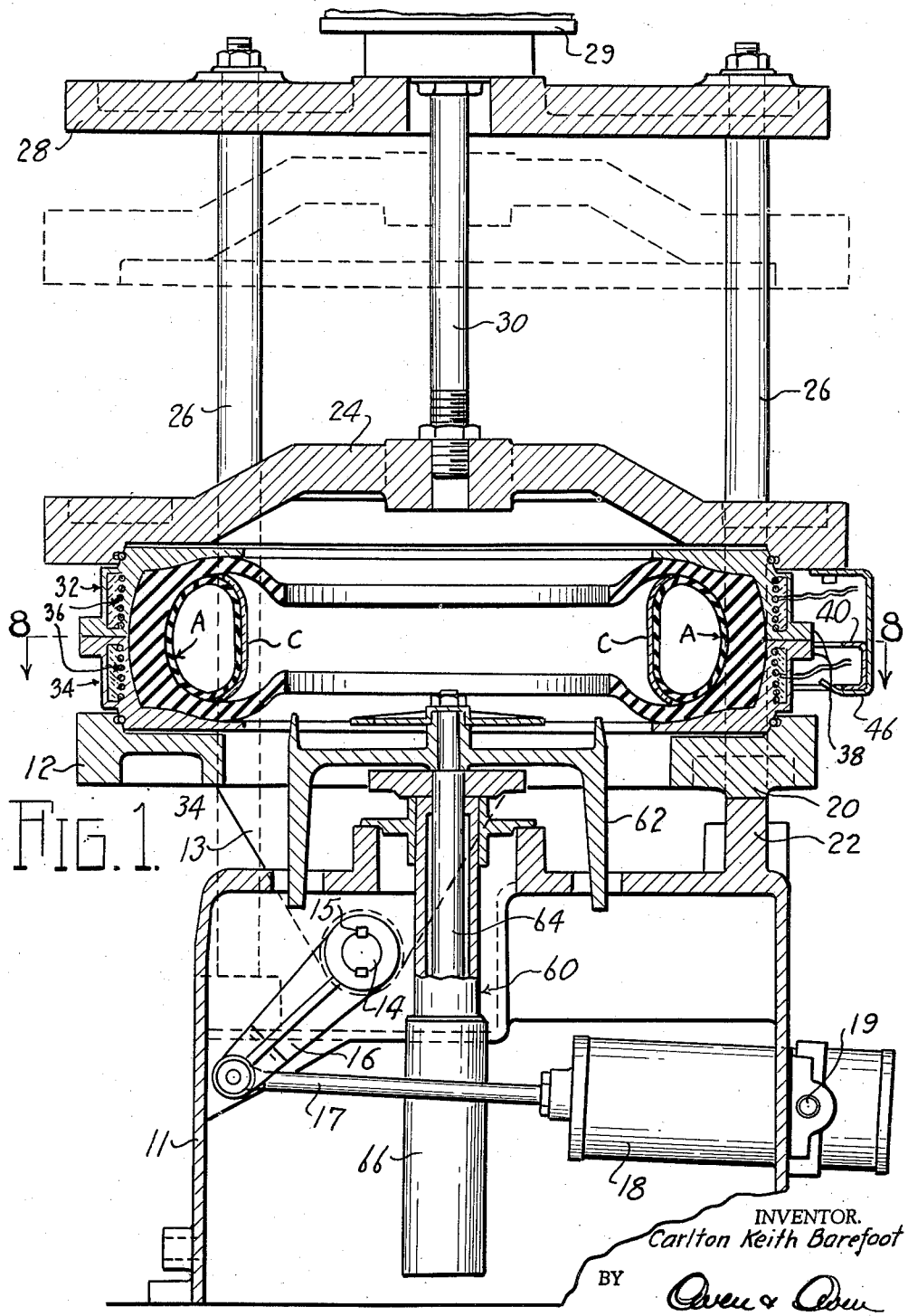
Fig. 1 is a central vertical section, with parts broken away and with parts shown diagrammatically of a machine constructed in accordance with the invention.
Figure 8:
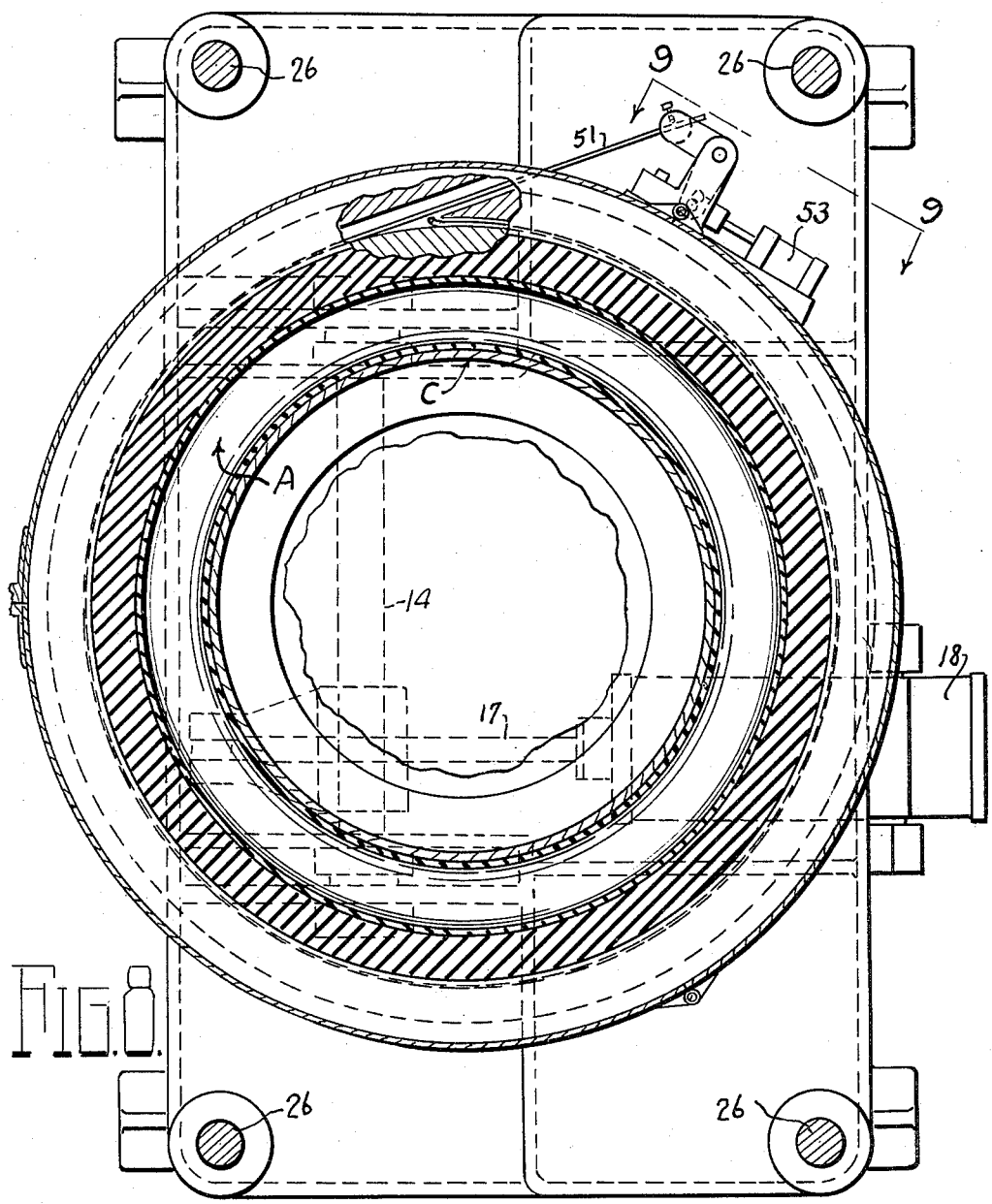
Figure 9:
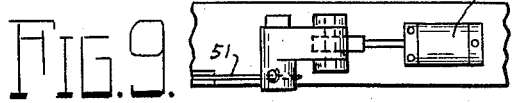
Figure 10:
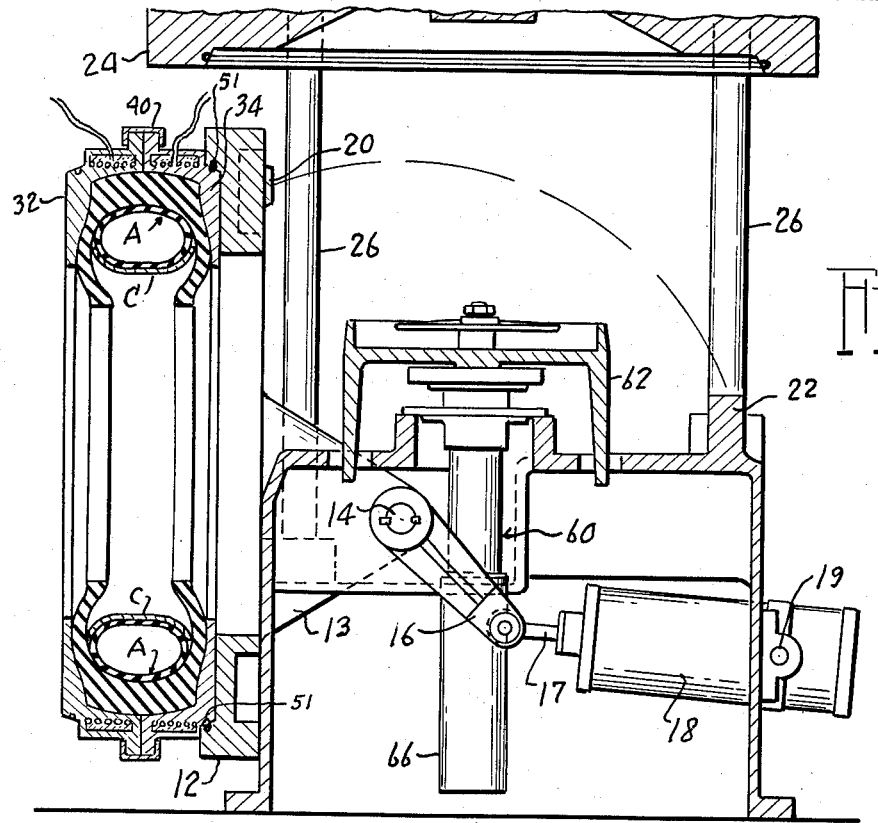
Figure 11:
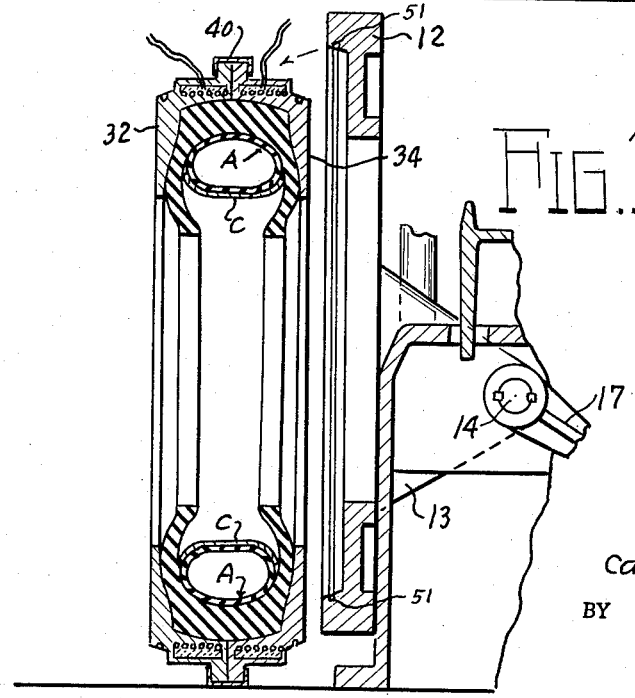

Figs. 6 and 7 are sections on the lines 6—6 and 7—7 of Fig. 3;

Fig. 8 is a section on line 8—8 of Fig. 1;

Fig. 9 is a fragmentary elevational view taken at line 9—9 of Fig. 8;

Fig. 10 is a fragmentary side elevational view, with parts in section, of a press showing a mold in partially discharged position;

Fig. 11 is a fragmentary view of the parts shown in Fig. 10 with the mold in fully released position, and Fig. 12 is a diagrammatic view showing a press and a series of associated molds discharged therefrom, with certain of the molds in vulcanizing position.

Referring to the drawings, and particularly to Fig. 1, the present invention comprises a press having a base 11 in which is mounted a swingable lower press platen member 12. Arms 13 project downwardly from the lower platen member to surround a rock shaft 14. Keys 15 interconnect the arms 13 and the rock shaft so that the swingable platen member 12 can be turned about the axis of the rock shaft by rotation thereof. An operating cylinder or any other suitable means may be used to rotate the rock shaft. In the form shown a rock arm 16 is keyed to and extends outwardly from the rock shaft 14 and at its free end is connected to an actuating piston rod 17 extending outwardly from a pneumatic cylinder 18 fixed to the press bed 11 in a suitable trunnion connection 19.

The swingable lower platen member 12 has a stop member 20 formed therein at one side and cooperates with an upstanding stationary bed portion 22 so that the platen is firmly supported against the base of the press when in its horizontal position.

An upper movable press platen 24 forms a part of the press and is guided for reciprocation in any suitable manner as by the usual corner tie rods 26 which extend upwardly from the base of the press to a crown member 28. An actuating cylinder shown fragmentarily in Fig. 1 is designated 29 and is fixed to the crown of the press. The piston rod actuated by the cylinder 29 is designated 30 and is connected in any suitable manner to the upper platen 24 for reciprocation of the platen.

Pneumatic presses for use in the vulcanization or retreading of tires are known in the art and any suitable machine may be used in carrying out the method of the present invention. Because of the weight of the parts which are handled by the press, however, a machine having a swingable lower platen member is preferred in carrying out the invention.

Referring again to Figs. 1 and 2 the present invention comprises upper and lower separately heatable circumferentially separable mold sections 32 and 34 which are releasably fixed respectively to the upper and lower press platens as hereinafter described. In the drawings the mold sections 32 and 34 are shown as being heated by electric resistance elements generally designated 36 in each instance although it is contemplated that steam heating of the molds in a manner well known in the art can be employed with equal facility. Each of the upper and lower mold sections 32 and 34 is provided with a mating peripheral flange 38 which, when the molds are brought together, form a continuous member which can be readily clamped to hold the two mold sections together in a tightly closed position. A clamp for this purpose is designated 40 in Fig. 1 and is shown therein in its removed position. The clamp 40 is shown in position around the flange elements 38 in Fig. 2, with the clamp being broken away in part.

The clamping band 40 comprises a channel-shaped band member made in several parts each of which is hinged to its circumferentially adjacent neighbor. Three parts are shown in the present instance and the band is ultimately closed by a latch 44 pivoted to one end of the band and cooperating with a dog or finger 45 attached to the opposite end, as shown in Fig. 3.

When not in use the band is supported by a plurality of brackets 46 which depend from the upper press platen 24 so that the band 40 can be raised out of the way when the press platen is raised as hereinafter described.

The upper and lower mold sections are held in their respective platens by any suitable releasable means. As shown in Figs. 3 and 8 such releasable means comprises a pneumatically actuated securing means constructed substantially in accordance with the expired patent to Glynn 1,841,408 with the substitution of a penumatic cylinder 48 for the manually operated lever shown in said patent. The releasable means comprises an annular groove 49 formed about the inner circumferential face of each of the platens, a matching groove 50 in the corresponding outer face of the adjacent mold and a continuous wire or rod element 51 normally disposed in the platen groove so as not to project outwardly therefrom together with the pneumatic cylinder 48 for moving the rod or wire element to cause it to be projected partially into the groove of the mold section while still remaining partially in the groove of the platen. When in the partially engaged position the rod fastens the two elements against axial movement, but when fully withdrawn into the platen groove releases the mold section therefrom.

The lower releasing cylinder is designated 53 in Fig. 8 and the action of fully retracting the wire or rod element is shown in Fig. 5 while the inter-engagement of the rod element with the platen and mold sections is shown in Fig. 4.

A suitable tire centering means designated generally 60 in Fig. 1 is provided. The tire centering means includes a spider 62 having a plurality of circumferentially spaced arms which engage the beads of a tire when projected upwardly by a piston 64 actuated by a pneumatic cylinder 66. The spider 62 is so chosen that the diameter of the ring formed by the depending arms thereof accurately fits the size of the tire that is being retreaded. For this purpose the spider 62 is made removable and can be changed to accommodate tires of different size. This tire centering means may take any suitable form but is preferably constructed in accordance with my Patent No. 2,793,397.

In operation, assuming that the upper and lower press platens are separated so that the lower platen 12 is supported by the bed 11 in the horizontal position shown in Fig. 1, the operator first locks the lower mold half 34 in the swingable lower platen 12 by actuating the cylinder 53 to force the wire or rod element into the inter-engaging position as shown in Fig. 5. The lower mold half is thus locked with respect to the associated platen. The upper mold half has been similarly locked from a preceding operation as will become apparent hereinafter.

The operator then places a properly prepared tire carcass with its unvulcanized rubber band therearound into the lower mold half. The tire as it is inserted in the press contains the usual air bag A and curing rim C. The tire carcass is then centered in the lower mold half by elevating the spider 62 which engages the beads of the tire and centers it circumferentially with respect to the mold. The upper press platen 24 is then lowered by admitting power fluid to the actuating cylinder 29 and the tire carcass is placed under the proper appropriate pressure which it is desired to retain during the entire vulcanizing or curing step. The ultimate closing operation of the press platens brings the mating flanges 38 together. The operator then removes the clamping band 40 from the hanger elements on which it has been supported, places the band 40 over the flanges 38 and closes the latch member 44 at the front of the press. The upper and lower mold halves are thus clamped in proper circumferential engagement and the tire carcass is held under a predetermined pressure within the complete mold thus formed.

The operator then releases the upper mold half from its associated press platen by admitting fluid to the actuating cylinder 48, causing the associated wire or rod to be withdrawn into the platen groove as shown in Fig. 4. The upper press platen may then be elevated to the dotted line position shown in Fig. 1.

Power fluid is then admitted to the actuating cylinder 18 which causes rock arm 16 to rotate the rock shaft 14 which swings the lower press platen with the mold thereon to the position shown in Fig. 10. It will be seen in this figure that the platen and mold have assumed a vertical position alongside the bed 11 of the press.

Actuation of the lower releasing cylinder 53 thereafter will release the mold from the lower press platen 12. If desired the mold can be received on a dolly or can be otherwise supported for easy conveyance away from the press. The mold with its tire body therein is then taken to any suitable part of the shop where the proper electrical connections can be made to the heating element within the mold so that vulcanizing of the tire can proceed for any desired time established by the operator. Fig. 12 diagrammatically indicates a press and a series of molds connected to a power source and containing tires in the process of curing.

Once a mold with the tire therein has been removed from the press the lower platen 12 can be returned to its horizontal position and a second mold placed in the cavity remaining from the removal of the first mold. The second mold can then be clamped in position by actuation of the cylinder 53 and the upper press platen brought down to engage the top mold half which can likewise be temporarily affixed thereto. A second tire body can then be placed in the mold and the procedure above described carried out to load the second tire in its appropriate mold and release it from the press for vulcanization at the remote station. It will be seen that since vulcanization does not take place within the press, the latter is free to operate on one tire body after another and is not tied up for any appreciable length of time. It has been found in practice that the full cycle of operations of loading and unloading a mold and of subsequently stripping a tire will not occupy the press for more than 4 minutes. Assuming that the average curing cycle is one and one half hours it will be seen that the productivity of the press has been increased by a factor of more than twenty. The only additional investment required of the operator is the plurality of molds and an appropriate remote location in which to support them during vulcanization of the contained tire.

When vulcanization has been completed of a tire the mold is brought back to the press, elevated to be received in the cavity of the lower swingable mold 12, and the press platen is swung to the horizontal position shown in Fig. 1. The upper press platen is brought down and the connecting wire or rod actuated by cylinder 48 is engaged thereto. The clamping band 40 is released from the flanges 38 and temporarily supported on the brackets 46. An opening motion of the press, that is a raising of the upper platen 24 will then strip the upper mold half away from the completed tire. If the tire exhibits a pronounced tendency to stick in the lower mold half the upper press platen can be used as an elevator for a hook which can be engaged between a suitable central portion of the upper platen and the rim or bead portion of the tire, in a manner known in the art. Obviously, when a tire has been stripped from a particular pair of mold halves, those halves are properly positioned in the press for the reception of another tire and for carrying out another vulcanizing cycle.

While the invention has been described in connection with a specific form and disposition of the parts, it should be expressly understood that numerous changes may be made without departing from the scope of the appended claims.

What I claim is:

1. In an apparatus for retreading tires, the combination of a closable press having a bed, and an upper platen and a lower platen, one of said platens being relatively movable to the other as said press is opened and closed, circumferentially separable tire mold sections, means to releasably connect each of said mold sections to a respective one of said platens for movement therewith, means to connect the tire mold sections together to form a self-sustaining mold body, means to remove a connected pair of mold sections from said press as a unit to support said pair apart from the press, and to return said pair to operative position with respect to said press platens, and each of said mold sections having provision for connection to means exterior of said press to cause heating of said connected mold sections to vulcanize a prepared tire carcass therein.

2. In an apparatus for retreading tires, the combination of a pneumatically closable press having relatively movable upper and lower platens and a bed, means to mount said lower platen for vertical swinging movements relative to said bed, circumferentially separable tire mold halves, means to releasably connect one of said tire mold halves to said upper press platen, means operable in all positions of said lower platen to releasably connect the other of said tire mold halves to said lower swingable platen, means to clamp said tire mold halves together to form a self-sustaining mold body, means to swing said lower platen and a connected mold to a position outside said press, and each of said mold halves having provision for connection to means exterior of said press to cause heating of said mold halves when clamped together to vulcanize a prepared tire carcass therein.

3. The combination of elements defined in claim 1, and means to center a tire carcass in at least said lower mold half.

4. The combination of elements defined in claim 2, in which said means to clamp said tire mold halves together comprises a sectional releasable encircling band.

5. In an apparatus for retreading tires, the combination of a closable press having relatively movable upper and lower platens and a bed, means to mount said lower platen for movement to a position away from said press bed, circumferentially separable tire mold halves each containing a heating means, means to releasably connect one of said tire mold halves to said upper press platen, means operable in all positions of said lower platen to releasably connect the other of said tire mold halves to said movable lower platen, means to clamp said tire mold halves together to form a self-sustaining mold body having its own heating means, means to move said lower platen and a connected mold to a position outside said press, and each of said mold halves having provision for connection to means exterior of said press to cause heating of said mold halves when clamped together to vulcanize a prepared tire carcass therein.

6. In an apparatus for retreading tires, the combination of a closable press having a bed and an upper platen and a lower platen, said platens being relatively movable to each other as said press is opened and closed, means carried by said press to move said lower platen from a position outside of said bed to a position over said bed and beneath said upper platen, circumferentially separable tire mold halves, means to releasably connect each of said mold halves to a respective one of said platens, means to connect the tire mold halves together to form a self-sustaining mold body and means to return the lower platen and the connected mold halves attached thereto to a position outside of the press.

7. In an apparatus for retreading tires, the combination of a closable press having a bed, and an upper platen and a lower platen, one of said platens being relatively movable to the other as said press is opened and closed, circumferentially separable tire mold halves, means to releasably connect each of said mold halves to a respective one of said platens for movement therewith, means to connect the tire mold halves together to form a self-sustaining mold body, means to remove a connected pair of mold halves from said press as a unit and to support said pair apart from the press, and to return said pair to operative position with respect to said press platens, and each of said mold halves having provision for connection to means exterior of said press to cause heating of said connected mold halves to vulcanize a prepared tire carcass therein.

References Cited in the file of this patent

UNITED STATES PATENTS

| 1,304,909 | Roberts | May 27, 1919 |
| 1,751,869 | Mayne | Mar. 25, 1930 |
| 2,055,742 | Burke | Sept. 29, 1936 |
| 2,793,397 | Barefoot | May 28, 1957 |

FOREIGN PATENTS

| 664,608 | Great Britain | Jan. 9, 1952 |